(No Model.) 2 Sheets—Sheet 1.
H. BITTINGER.
MACHINE FOR SEPARATING MIDDLINGS AND FLOUR.
No. 502,696. Patented Aug. 8, 1893.
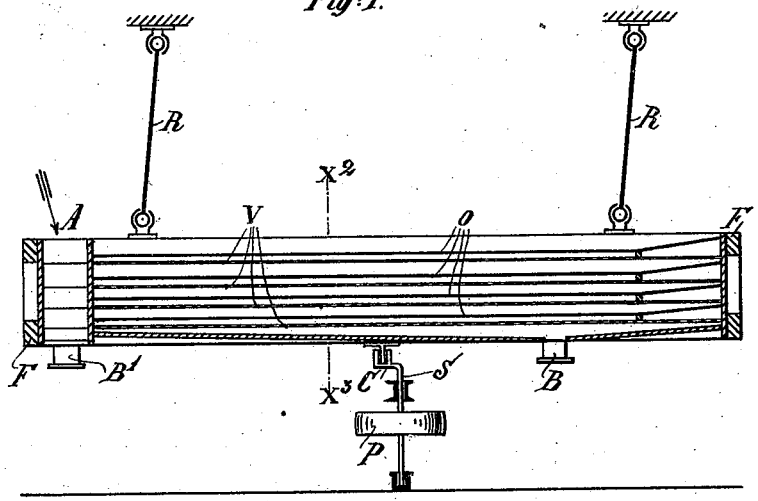
Fig. 1.
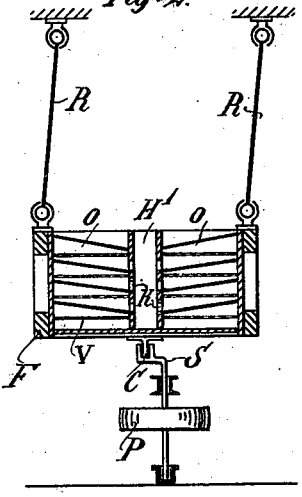
Fig. 2.
Fig. 3.
Fig. 3ª.
Witnesses:
Carl Rossbach.
H. Walther.
Inventor:
Hans Bittinger
by Robert Seiffe
Attorney.

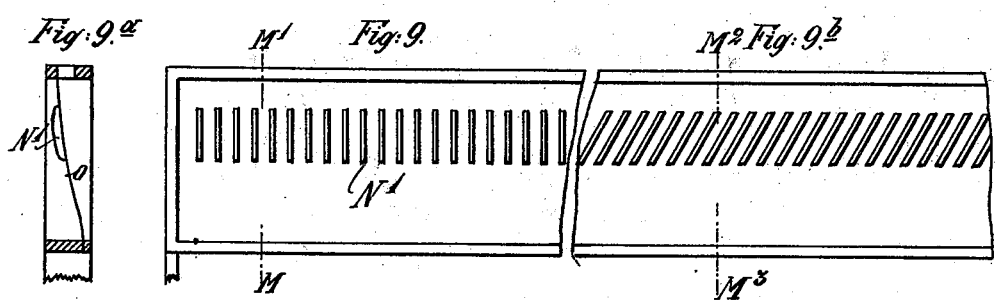
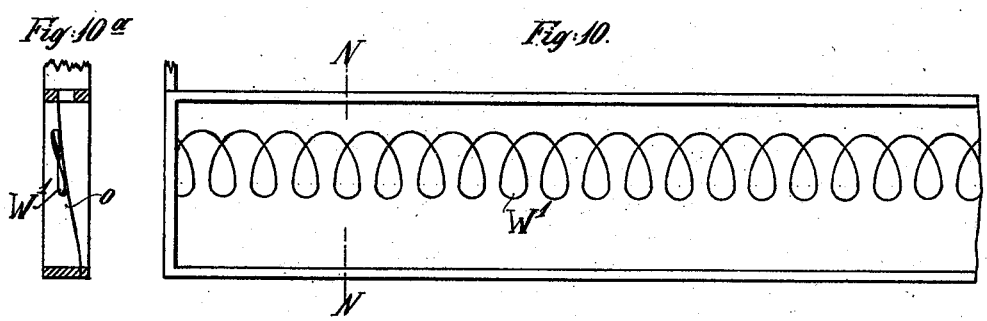
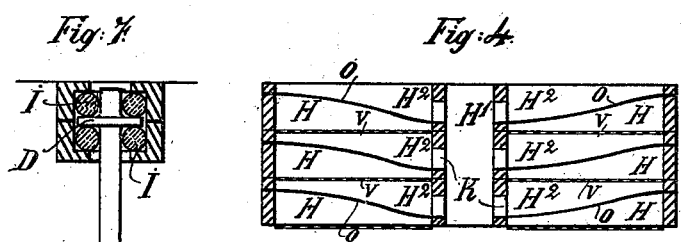
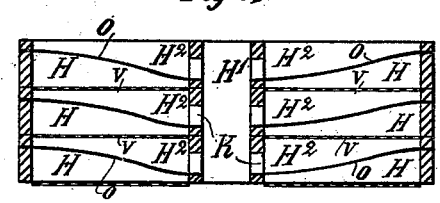
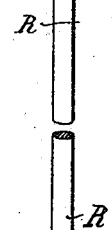
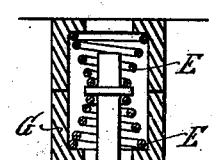
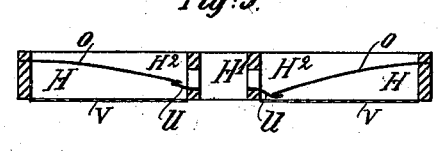
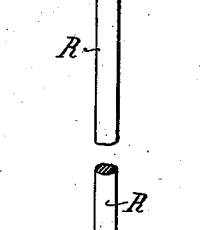
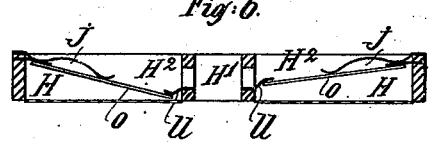
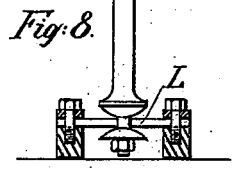
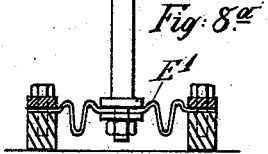

UNITED STATES PATENT OFFICE.

HANS BITTINGER, OF REGENSBURG, GERMANY.

MACHINE FOR SEPARATING MIDDLINGS AND FLOUR.

SPECIFICATION forming part of Letters Patent No. 502,696, dated August 8, 1893.

Application filed October 11, 1892. Serial No. 448,598. (No model.)

*To all whom it may concern:*

Be it known that I, HANS BITTINGER, a subject of the King of Bavaria, and a resident of Regensburg, in the Kingdom of Bavaria, German Empire, have invented certain new and useful Improvements in Machines for Separating Middlings and Flour, of which the following is an exact specification.

My invention relates to a machine for separating middlings and flour, in which the matter to be separated is placed on horizontal sieves, subjected to a continuous vibrating motion, and in which oscillating covers are employed for driving the middlings or the flour through the meshes of the sieves and transporting it toward the delivery channels.

My invention has a threefold object in view. first, to cause a continuous vibration of the sieves; secondly, to provide means for the oscillation of the covers, and, thirdly, to avoid the friction in the suspension joints and protect the sieves from any shocks.

My invention will be more readily understood by reference to the accompanying drawings, in which—

Figure 1 is a longitudinal section on line X X' of Fig. 3 showing my improved middlings and flour separator. Fig. 2 is a cross sectional view on line $X^2 X^3$ of Fig. 1. Fig. 3 is a plan of the separator. Fig. $3^a$ is a modification of Fig. 3. Fig. 4 represents a cross-sectional elevation showing three superposed sieves with their oscillating covers. Fig. 5 illustrates a cross-sectional view showing a modification of a sieve and cover, the latter being made of an elastic material. Fig. 6 is a similar view of a modification in which the non-elastic cover is suspended by means of springs. Figs. 7 and $7^a$ illustrate the construction of the elastic joints. Figs. 8 and $8^a$ show modifications of these constructions. Fig. 9 shows the under side of a cover being provided with thin laths. Fig. $9^b$ shows the same with such laths obliquely arranged. Fig. $9^a$ is a section of the cover on line M M' of Fig. 9 or on line $M^2 M^3$ of Fig. $9^b$. Fig. 10 shows the under side of a cover being provided with a spiral wire. Fig. $10^a$ is a section on line N N of Fig. 10.

In carrying my invention into effect, I construct the machine of a frame F, which is supported in its center by a crank C and suspended by means of rods R. The manner of securing the frame F is however immaterial, provided it does not impede the vibrating motion of the frame, as described hereinafter. I may also employ uprights and cranks or equivalent means for supporting the frame F at its corners instead of suspending it by means of the rods R.

Within the frame F, I arrange a series of parallel sieves V, covered in their whole length, except a short portion at their left end, with the covers O O, which divide the space between each pair of sieves in two parts, one part H H H communicating with the chute B' and the other one $H^2 H^2$ communicating by the openings K K with the longitudinal middle channel H' tapering in the chute B.

The covers O O are made of suitable material, being elastic or non-elastic, such as leather, sheet iron or wood and are attached to the frame F either directly or by means of strips of leather U U (Figs. 5 and 6). Besides this the covers O O are provided on their under sides with thin laths L' (Figs. 9, $9^a$, $9^b$) or a spiral wire N' (Figs. 10, $10^a$) affixed to the covers in such a manner, that the covers, when at rest, are thereby forced to assume their lowest position.

A is the feed channel of the machine and B B' are the chutes, through which the middlings and finer flours are delivered according to their specific weight.

P is a pulley wheel for rotating the shaft S, on which the crank C is mounted.

The rods R by means of which the frame F is suspended are provided with elastic joints, as shown in Figs. 7, $7^a$, 8 and $8^a$. In Fig. 7 the end of the rod R is provided with a collar D held between two rings I of rubber or any other elastic material located inside a casing G. In Fig. $7^a$ the collar D is held in place by two spiral springs E inclosed within the casing G. In Fig. 8 the end of rod R is secured to an elastic plate L. In Fig. $8^a$ the end of rod R is fastened to an undulated elastic plate E'. Any of these joints may be employed, or several of the forms of construction shown may be used conjointly.

The operation of my improved machine is as follows: The shaft S is rotated by means of the pulley P, and the crank C imparts a horizontal vibrating motion to the frame F, each point of the latter describing a small circle the radius of which is equal to the length of the crank C, as will be seen by reference to the arrows marked in Figs. 3 and $3^a$. The middlings (or flour) to be separated are entered through the feed-channel A and fall on the ends of the sieves V. There they are constantly agitated by the vibration of the frame F, the lighter and coarser parts of inferior quality rising to the surface. The vibration of the frame is however not sufficient for transporting the material to the delivery chutes; this is effected by the oscillating covers O, which operate in the following manner: When the frame F moves from the right to the left as indicated in Fig. 4, the portions of the covers O on the left of the central channel H′ will be raised by centrifugal force so as to present a convex upper surface, as shown. In consequence thereof, a compression of air will take place below the sieves V (in the spaces $H^2$) and a partial vacuum above the same (in the spaces H) so that all lighter particles will be kept suspended above the sieves; the finer particles constituting flour of superior quality will however pass through the meshes of the sieves V and glide on the upper surface of the covers O onto the openings K and into the channel H′, which is formed with an inclined bottom so as to deliver the flour through the chute B. On the right of the central channel H′ the reverse will be the case, that is to say, the covers O, under the influence of the air pressing the same inward, will assume the shape shown in Fig. 4 at the right hand, presenting a concave upper surface. Consequently, a partial vacuum will be created below the sieves V (in the spaces $H^2$) and the air compressed above the same (in the spaces H.) Thereby the air will be forced through the sieves V from above to below, preventing an obstruction of the meshes and at the same time cooling and ventilating the material. It will be obvious that after half a revolution of shaft S the frame F will move from the left to the right, and the covers O will move vertically, the positions on the left and right side of the channel H′ being interchanged. It will be understood that an oscillating motion of the covers O will thus be obtained. The materials lying on the sieves V will alternately be pressed against the same and released, whereby they will be carried toward the delivery end of the frame F. In order to facilitate the transportation of this lighter and coarser material, the covers O may be fitted with a rough fabric, or corrugated on their lower side. It will be further understood that the oscillation of the covers O will produce continuously oscillating vertical air-waves, so that a continuous and easy separation of flour and the middlings is obtained. The latter, having traveled from one end of the sieves V to the other, fall into channels leading them to the chute B′ where they are delivered.

The object and the operation of the elastic joints by which the rods R are suspended and connected to the frame F will be obvious without further explanation. By this construction I avoid all shocks and obtain an easy and uniform motion of the frame F, without lubricating the joints because there are no rubbing surfaces at all.

I will now describe the modifications illustrated by Figs. 5 and 6. In Fig. 5 the cover O is made of a stiff elastic material such as sheet iron and the like. In Fig. 6 I have shown a cover O made of a stiff non-elastic material and kept in a somewhat elevated position by means of a spring J. The operation of these covers is the same as before described.

What I claim, and desire to secure by Letters Patent of the United States, is—

1. A machine for separating middlings and flour, comprising a frame containing horizontal sieves, means for vibrating said frame in a horizontal plane, rods, provided with elastic joints, for holding the frame, covers above the sieves adapted to oscillate automatically up and down, and means for delivering the particles driven through the meshes of the sieves and those remaining on the same through separate chutes, for the purposes set forth.

2. In a machine of the kind described: the frame F, having longitudinal superposed side channels H and $H^2$, central channel H′, openings K affording a communication between both, sieves V, and covers O above the same, said covers being fastened longitudinally to the frame F and inclined transversely to the same, substantially as described, for the purpose specified.

3. In a machine of the kind described, the rods R provided at their ends with collars D, held between two buffers of an elastic material arranged within a casing G, for the purpose set forth.

4. In a machine of the kind described, the rods R, provided at their ends with collars D, held between two rings of an elastic material arranged within a casing G, substantially as and for the purpose described.

5. In a machine of the kind described, the suspension rods R rigidly connected on their ends to corrugated plates E, for the purpose as described.

In testimony whereof I have signed this specification in the presence of two subscribing witnesses.

HANS BITTINGER.

Witnesses:
J. STEFFINO,
HERM. GERMECK.